United States Patent
Bagley et al.

(10) Patent No.: US 7,662,091 B2
(45) Date of Patent: Feb. 16, 2010

(54) FLEXIBLE BORESCOPE ASSEMBLY FOR INSPECTING INTERNAL TURBINE COMPONENTS AT ELEVATED TEMPERATURES

(75) Inventors: Paul Bagley, Middleburg, NY (US); Robert Roney, Schoharie, NY (US); Richard McConnell, Duluth, GA (US); Dean Roney, Middleburg, NY (US); Sean McDonnell, Union, NJ (US); Kenneth J. Hatley, Madison, NJ (US); Richard Hatley, Convent Station, NJ (US); Peter McGrath, Fair Lawn, NJ (US)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 11/024,940

(22) Filed: Dec. 30, 2004

(65) Prior Publication Data

US 2006/0146127 A1    Jul. 6, 2006

(51) Int. Cl.
*A61B 1/005* (2006.01)
(52) U.S. Cl. .................. 600/146; 600/149; 600/141; 600/114
(58) Field of Classification Search ......... 600/146–150, 600/139–142, 129, 130
See application file for complete search history.

(56) References Cited

U.S. PATENT DOCUMENTS

| | | | |
|---|---|---|---|
| 1,601,983 A * | 10/1926 | Savage | 446/362 |
| 4,790,624 A * | 12/1988 | Van Hoye et al. | 385/118 |
| 5,174,277 A * | 12/1992 | Matsumaru | 600/142 |
| 5,203,772 A * | 4/1993 | Hammerslag et al. | 604/528 |
| 5,628,667 A * | 5/1997 | Levi | 446/278 |
| 5,916,147 A * | 6/1999 | Boury | 600/146 |
| 6,030,360 A * | 2/2000 | Biggs | 604/95.01 |
| 7,063,682 B1 * | 6/2006 | Whayne et al. | 604/95.04 |
| 7,090,637 B2 * | 8/2006 | Danitz et al. | 600/141 |
| 7,121,098 B2 * | 10/2006 | Hatcher | 62/5 |
| 7,128,956 B2 * | 10/2006 | Wang et al. | 428/36.9 |
| 2004/0199052 A1 * | 10/2004 | Banik et al. | 600/142 |
| 2004/0216468 A1 * | 11/2004 | Hatcher | 62/5 |

* cited by examiner

*Primary Examiner*—John P Leubecker
*Assistant Examiner*—Victoria W Chen
(74) *Attorney, Agent, or Firm*—Nixon & Vanderhye, P.C.

(57) ABSTRACT

A borescope is received within a housing. The borescope includes a flexible end portion carrying the video head and a housing includes a flexible end portion comprised of ball-socket segments and a tip for following the movement of the flexible end portion of the borescope. Cooling air is provided in an annular passage between the borescope and housing for flow about the borescope to maintain the video head temperature below its temperature limitation. Two cables maintain the ball-socket segments and tip in contact with a transition piece and with one another to enable the flexible borescope end portion to follow the movement of the directionally controlled video head.

3 Claims, 7 Drawing Sheets

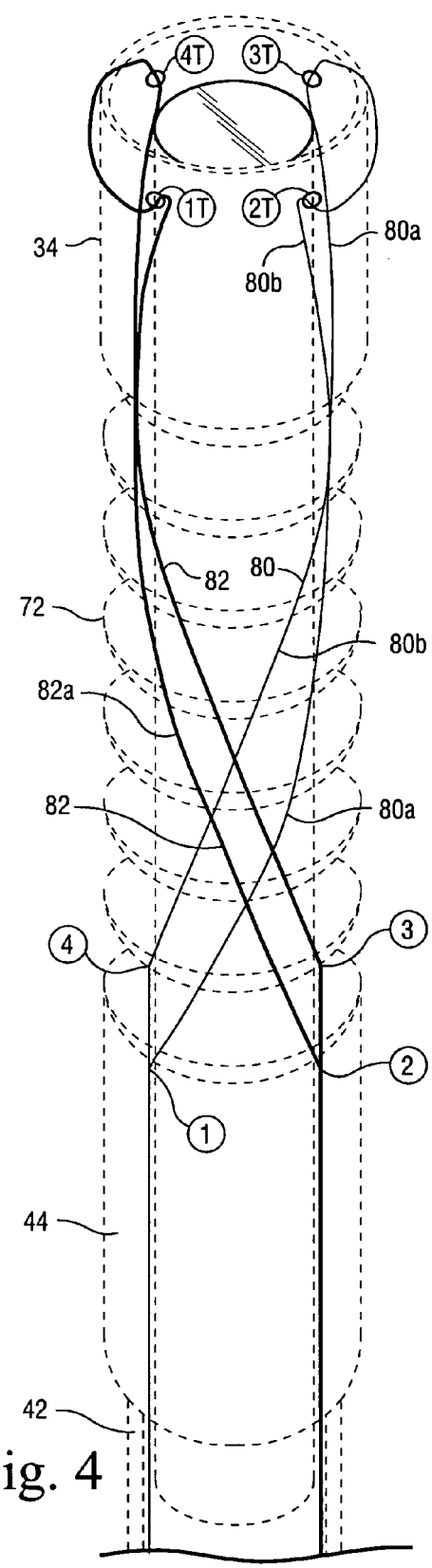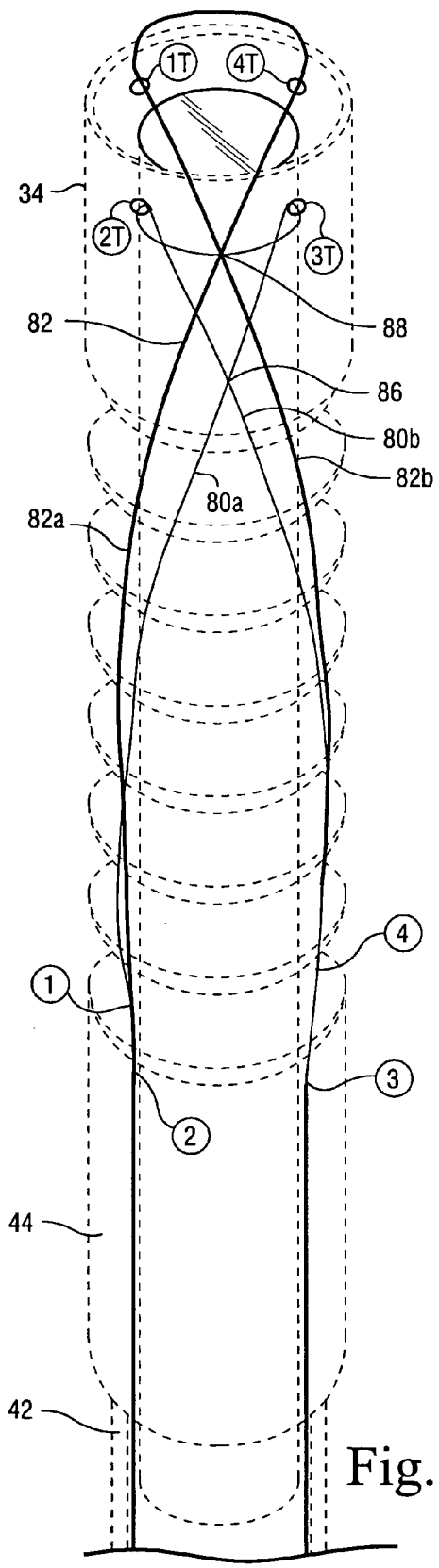
Fig. 4
Fig. 5

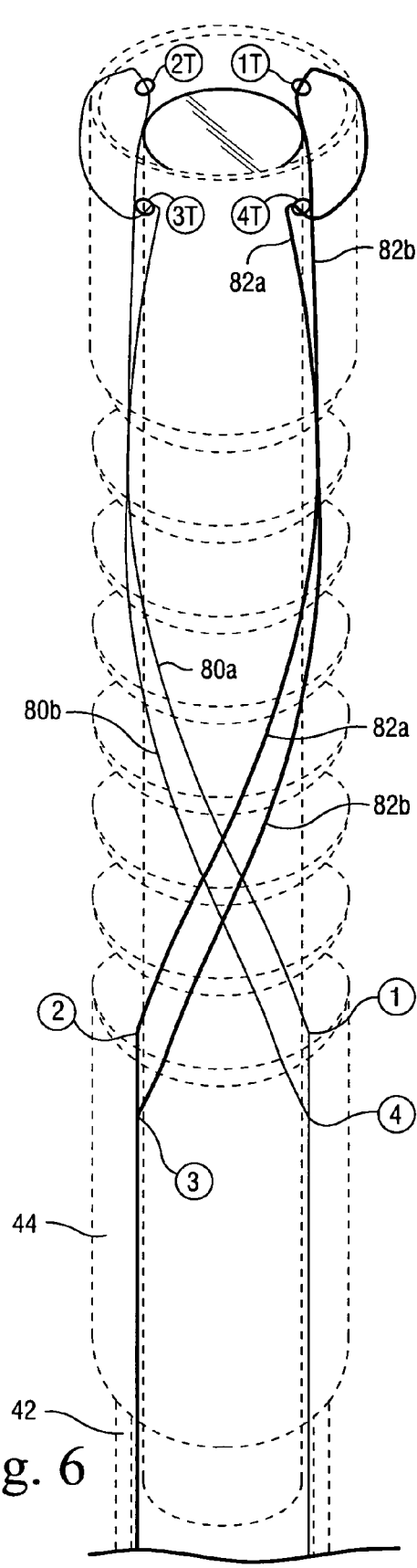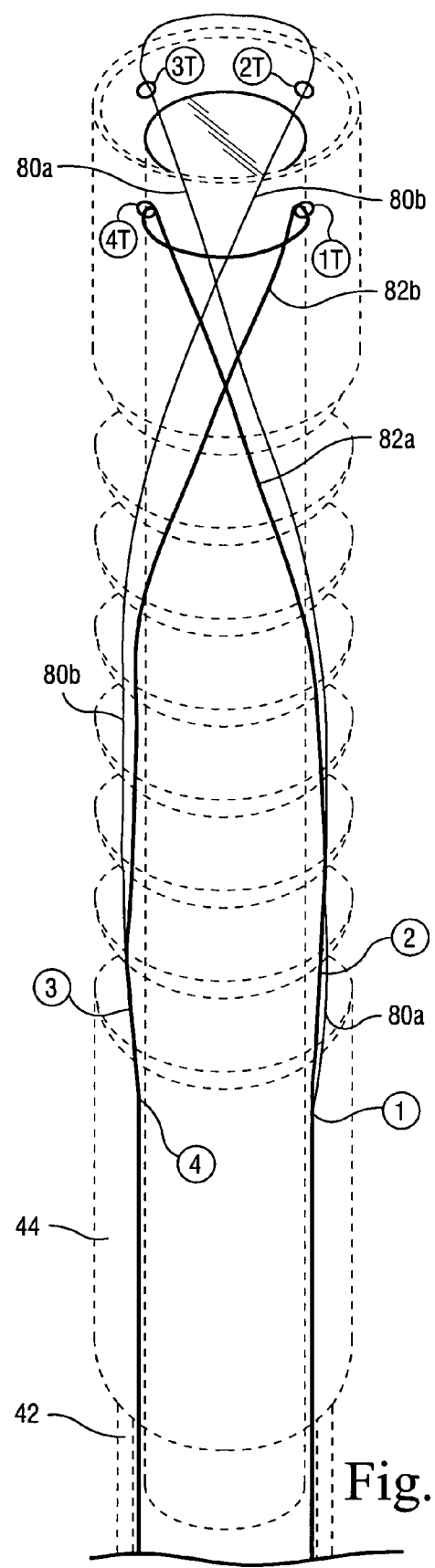

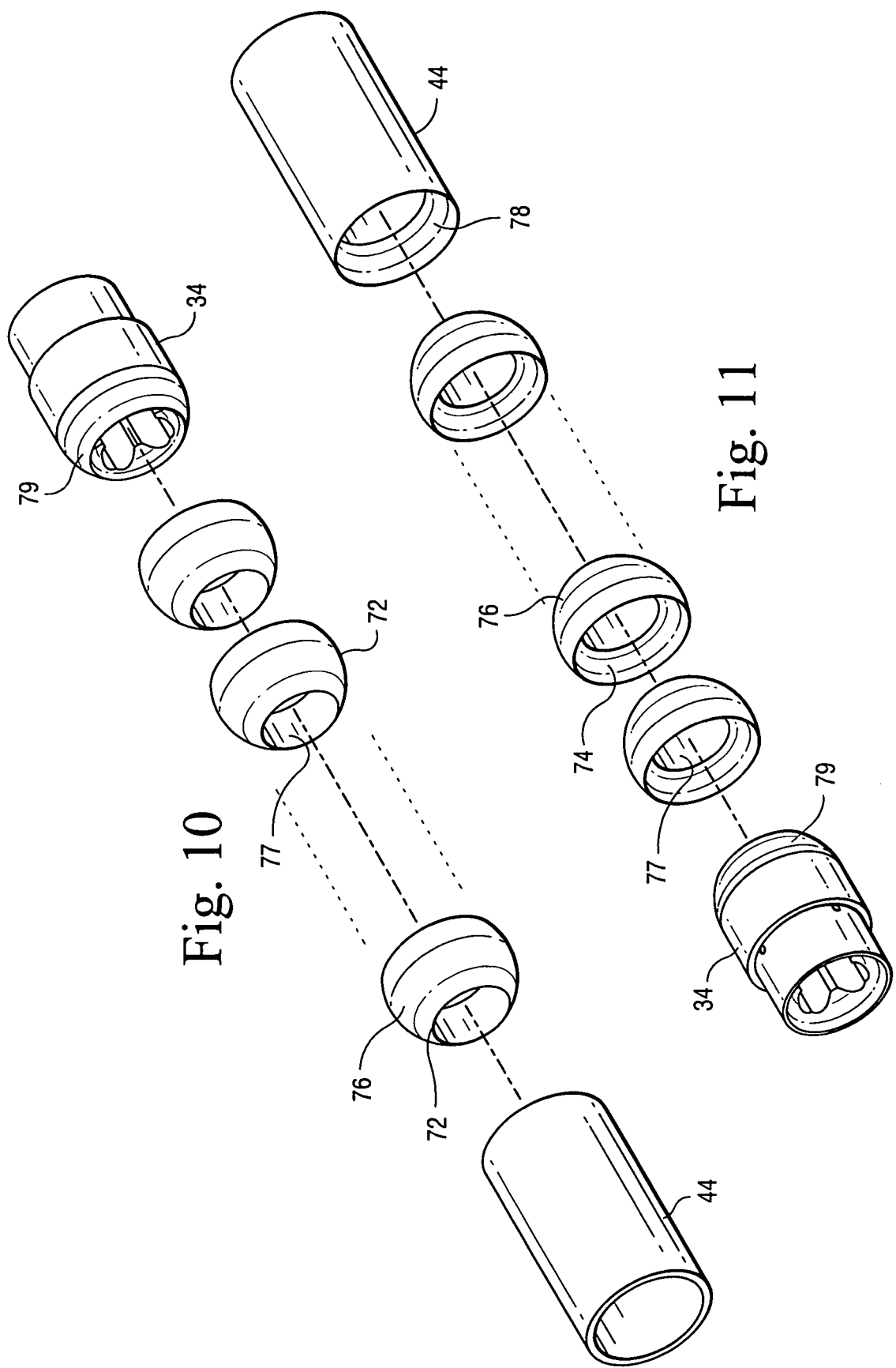

FLEXIBLE BORESCOPE ASSEMBLY FOR INSPECTING INTERNAL TURBINE COMPONENTS AT ELEVATED TEMPERATURES

The present invention relates to a borescope assembly and method for inspecting internal components of a turbine at elevated temperatures and particularly relates to a flexible borescope assembly having a passage for flowing a cooling medium to cool the borescope while inspecting internal turbine components at elevated temperatures.

BACKGROUND OF THE INVENTION

Internal components of gas and steam turbines, for example, steam turbine blades are typically visually inspected by inserting a borescope through an opening in the outer turbine shell and articulating the video head of the borescope to achieve the desired inspection view. It will be appreciated that each inspection is conducted during a turbine outage. Typically a substantial waiting period is necessary after shutdown and before inspection because current flexible borescope inspection equipment has a temperature limit of approximately 120° F. As a result of this temperature limitation, gas and steam turbine inspections cannot be performed until the turbine cools down from its normal operating temperature to a temperature less than the about 120° F. flexible borescope temperature limit. The problem is particularly exacerbated in steam turbines which typically require weeks to cool down from operating temperatures, for example, upwards of 1050° F., to the limit of about 120° F. While gas turbines typically cool faster than steam turbines, there is a time delay even with gas turbines before visual inspection of internal gas turbine components can be performed using temperature limited flexible borescopes. Consequently where the articulation capability of a flexible borescope is required, the current and only option is to wait until the turbine cools down to below the temperature limit imposed by the flexible borescope before inspection can proceed. Accordingly, there is a need to minimize the time delay previously necessary to enable inspection of internal turbine components at elevated temperatures.

BRIEF DESCRIPTION OF THE INVENTION

In a preferred embodiment of the present invention there is provided an apparatus for insertion through an opening in an outer casing of a turbine and inspection of internal turbine components at elevated temperatures comprising:(a) an elongated borescope having a video head adjacent one end thereof; (b) an elongated housing for receiving said borescope; and (c) a cooling tube carried by said apparatus for flowing cooling a cooling medium from a location external to the turbine to cool said borescope at a location at least adjacent said one end of the borescope thereby enabling inspection of internal turbine components at elevated temperatures.

In another preferred aspect of the present invention, there is provided an apparatus for insertion through an end opening in an outer casing of a turbine and inspection of the internal turbine components at elevated temperatures comprising: (a) an elongated borescope having a video head adjacent one end thereof; (b) an elongated housing for receiving said borescope; and (c) said borescope including a directionally controllable flexible end portion for moving the video head to different angular orientations within the turbine, said housing including a flexible end portion about the controllable flexible end portion of said borescope enabling the flexible end portion of the housing to follow the movement of the flexible end portion of the borescope.

In a still further embodiment of the present there is provided a method of visually inspecting an internal component of a turbine comprising the steps of: (a) inserting a borescope having a video head at one end through an opening in an outer casing of a turbine to locate the video head adjacent the internal component to be inspected; and (b) cooling the borescope including the video head while the video head is located adjacent the internal components.

BRIEF DESCRIPTION OF THE DRAWINGS

FIGS. 4-7 are perspective views of a preferred cable thread-up for maintaining the ball-socket segments, transition piece, and tip engaged with one another along a flexible end portion of the housing, the illustrated end portion being rotated 90° clockwise from FIG. 4 through FIG. 7;

FIGS. 10 and 11 are exploded perspective views of ball-socket segments, a transition piece and a tip forming part of a flexible end portion of the housing.

DETAILED DESCRIPTION OF THE INVENTION

Figure 1:
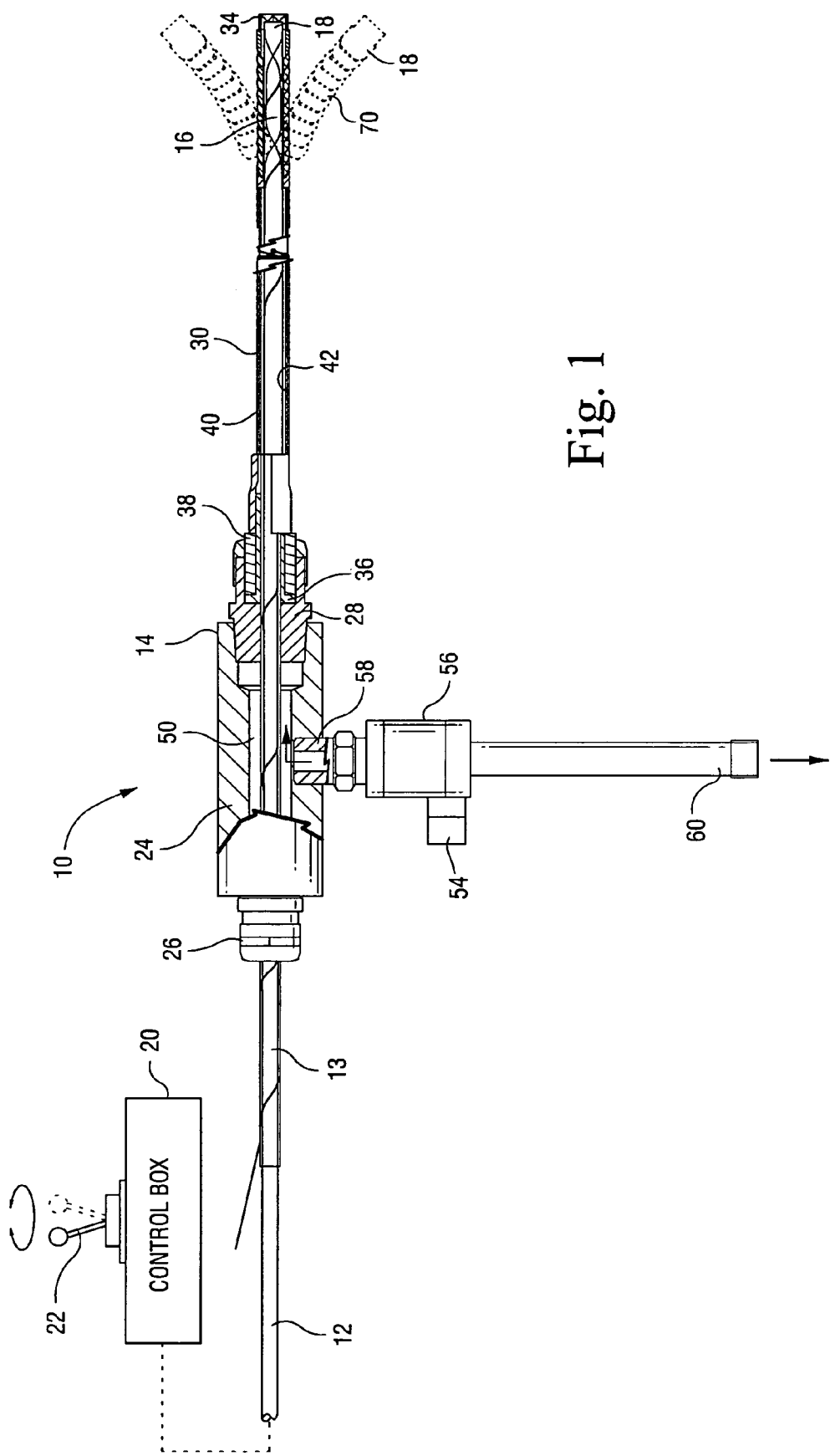
FIG. 1 is an elevational view with portions in cross section of an inspection apparatus for internal turbine components including a borescope and a housing for facilitating cooling of the borescope.
Figure 2:
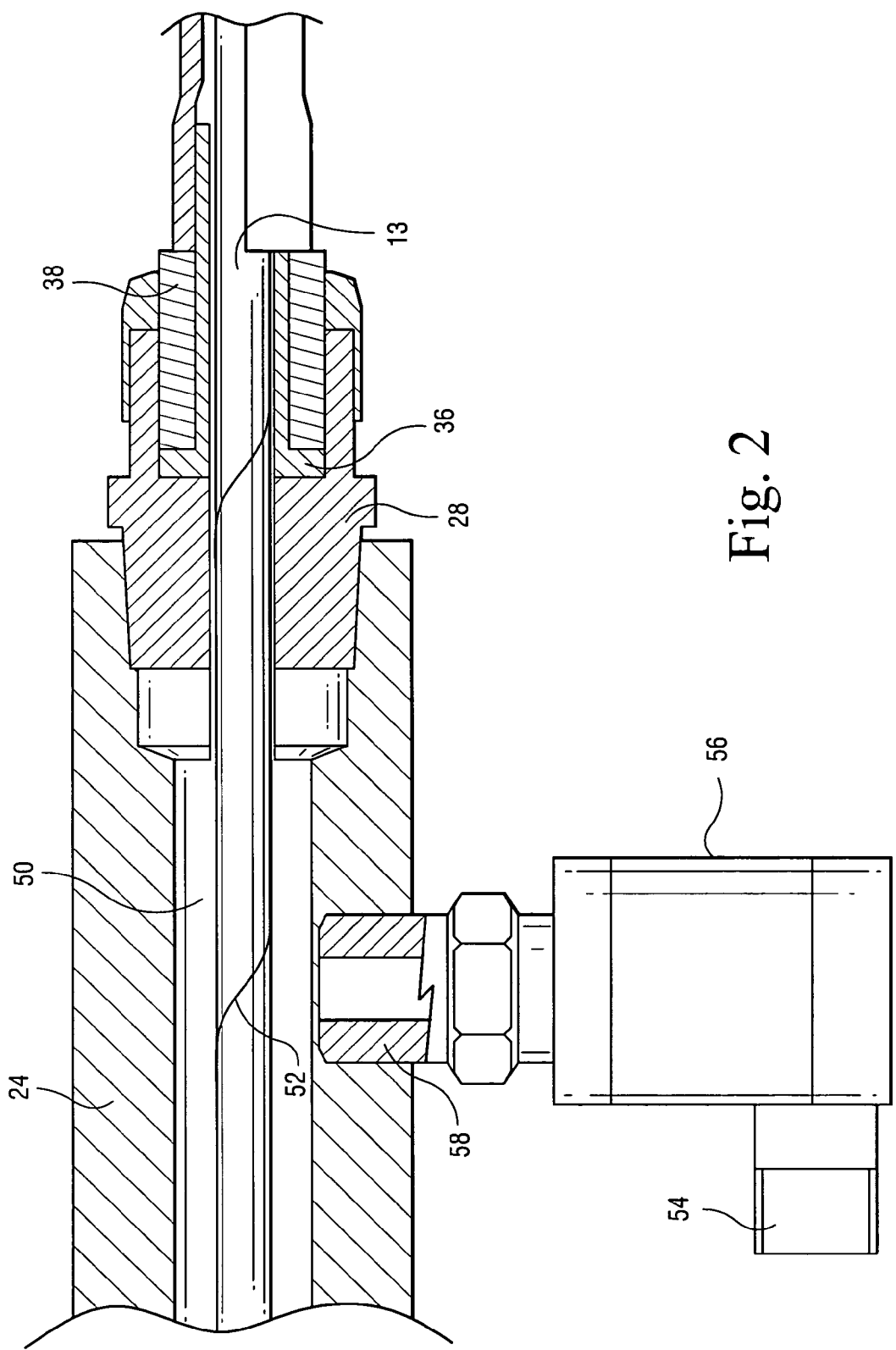
FIG. 2 is an enlarged fragmentary cross sectional view of a portion of the housing with the borescope installed within the housing.

Referring now to the drawings, particularly to FIG. 1, there is illustrated a borescope assembly generally designated 10 and comprised of a borescope 12, a liner 13 about the borescope and a housing 14 for receiving the combined borescope 12 and liner 13, the assembly facilitating flow of a cooling medium, e.g. air to temperature limited parts of the borescope, e.g. a video head 18 of borescope 12. The borescope 12 may be a conventional flexible borescope, such as the borescope identified as an Olympus IPLEX 6 mm. In that conventional borescope, the borescope includes a flexible end portion 16 mounting a video head 18 and which flexible end portion 16 can be manipulated to directionally control the video head 18 when inside a turbine. Directional control of video head 18 is provided conventionally by a control box 20 having a joy stick 22 external to the turbine. Thus, video head 18 is directionally controlled such that a selected one or more components internal of the turbine can be viewed externally of the turbine as is conventional. As noted previously, the borescope particularly the video head 18, has a temperature limitation of about 120° F. which, if exceeded, would negatively impact the performance of the borescope. Consequently, the borescope 12 in accordance with the preferred aspect of the present invention is cooled preferably by flowing a cooling medium along a substantial portion of the length of the borescope and particularly about the video head 18.

To accomplish the foregoing, the borescope 12 is received within the housing 14. Housing 14 facilitates the flow of the cooling medium about the borescope and which cooling medium exits at the tip of the borescope. The cooling medium lies in heat exchange relation with the temperature limited portions of the borescope enabling the borescope per se to operate within its temperature rated limitation notwithstanding higher temperatures, e.g., on the order of 350° F. within the turbine and to which temperature the borescope is exposed. The housing 14 includes a manifold 24 having cord grips 26 and 28 comprising fittings at opposite ends of the manifold 24 through which the borescope 12 is disposed. The housing 14 also includes a cooling tube 30 which extends from the cord grip 28 to a tip 34 of the housing. The cooling tube includes a strain relief collar 36, a strain spacer 38, Nomex cladding 40, a cooling sleeve 42, a transition piece 44, a plurality of discrete ball-socket segments 46 and tip 34. As illustrated, the liner 13 envelops substantially the entire length of the borescope up to but excluding flexible end portion 16. In use, the borescope extends through the housing 14 to the tip 34 of the housing, the liner 13 about the borescope extending only to the transition piece 44.

Manifold 24 includes a central plenum 50 through which the liner and borescope are received. The cord grip 28, strain relief collar 36 and the cooling sleeve 42 have internal diameters in excess of the external diameter of liner 13 thereby forming an annular passage 51 for flowing cooling medium from plenum 50 along the cooling sleeve 42 and within the ball-socket segments 46 to tip 34. Also illustrated is a thermocouple wire 52 wound about the liner 13 and extending from the control box 20 to a sensing head, not shown, adjacent tip 34 whereby the temperature of the turbine components adjacent tip 34 can be measured.

To provide a cooling medium for flow through the cooling passage 51 and about the borescope 12 including the video head 18, ambient or supplied air is preferably utilized as the cooling medium and is provided through an inlet 54 to a vortex chiller 56. Vortex chiller 56 is conventional in construction and reduces the temperature of the ambient or supplied air, e.g. to about 45° F. for flow through an outlet 58 into the plenum 50 of manifold 24. Exhaust heat generated by chiller 56 is dumped from the chiller 56 at an exhaust heat air outlet 60.

Figure 3:
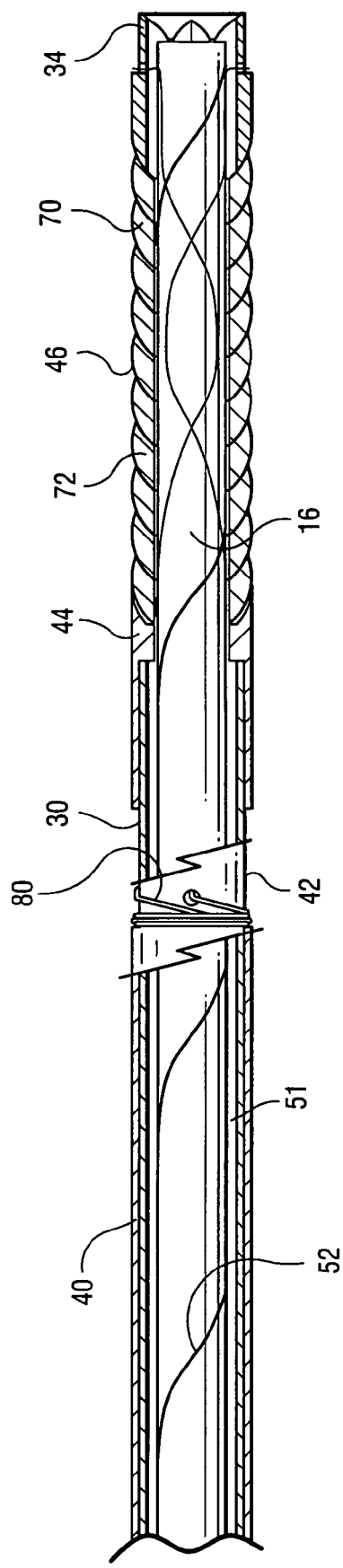
FIG. 3 is a. fragmentary cross sectional view illustrating portions of the cooling tube and flexible end portions of the borescope and housing.

The flexible end portion 16 of borescope 12 as illustrated in FIGS. 1 and 3, extends within a corresponding flexible end portion 70 (FIG. 3) of housing 14. End portion 70 comprises a plurality of individual, hollow and substantially cup-shaped ball-socket segments 72 (FIGS. 10 and 11) each having an exterior convex spherical surface 76 forming the ball portion of the ball-socket segment 72 and an interior concave spherical surface 74 forming the socket portion of the ball-socket segment 72. Each segment 72 includes a central axial opening 77 having an internal diameter in excess of the external diameter of the borescope 12 and liner 13. When the borescope 12 is disposed in housing 14, the annulus formed between ball-socket segments 72, when engaged (i.e., nested) with one another, and the borescope 12 form a portion of the cooling medium passage 51 extending from plenum 50 to tip 34. The transition piece 44 also includes a concave end surface 78 forming a socket for receiving the convex ball portion of the initial ball-socket segment 72. Tip 34 includes a convex ball surface 79 for receiving the concave socket of the final ball-socket segment 72 adjacent the tip of the housing. Thus, the segments 72 can articulate relative to one another and relative to the fixed transition piece 44 and tip 34 of the housing 14 to follow the movement of the directionally controlled flexible end portion 16 of the borescope.

Figure 9:
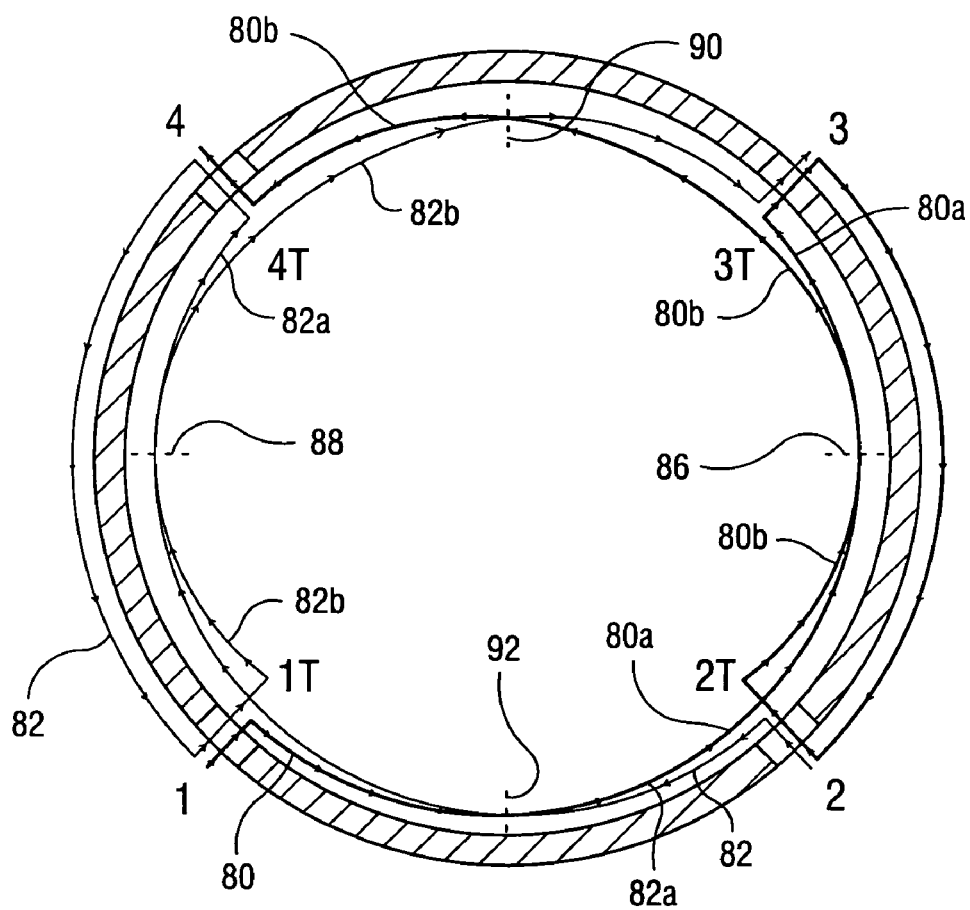
FIG. 9 is a schematic axial illustration of the thread-up turns of the respective cables.

To maintain the ball-socket segments 72 engaged with one another and with the transition piece 44 and tip 34 throughout the range of flexible movement of the respective flexible end portions 16 and 70 of the housing and borescope, at least two cables 80 and 82 are extended from the cooling sleeve 42 internally within the transition piece 44, the ball-socket segments 72 and the tip 34. FIGS. 4-7 illustrate the thread up of the cables. For convenience and clarity, the drawing FIGS. 4-7 illustrate the ball-socket segments 72, tip 34, transition piece 44 and cooling sleeve 42 in dashed lines and the cables as illustrated in respective heavier and lighter lines. Also for ease of description and clarity, the cooling sleeve 42 has four radial holes about 90° apart at an axial location adjacent the transition piece 44. The radial holes are labeled 1, 2, 3 and 4. Radial holes about the axis are also formed through the end of tip 34 and are correspondingly designated as holes 1T, 2T, 3T and 4T. FIG. 9 illustrates schematically a superposition of the top openings 1T, 2T, 3T and 4T over the fixation points 1, 2, 3, and 4 on sleeve 44.

As noted previously, two cables 80 and 82 are threaded from cooling sleeve 42 to (i) extend internally through the transition piece 44, (ii) spiral about and along the cooling passage 51 defined between the ball-socket segments 72 and the borescope, (iii) extend internally within the tip 34 and outwardly through a pair of tip openings, (iv) extend externally about the tip for about a quarter turn, (v) return through another pair of tip openings to extend within the tip 44 and (vi) finally return internally and spirally about the segments 72 and through transition piece 44 to fixation points on the sleeve 42. For example, cable 80 is fixed to the sleeve 42 at location 1 and leg 80*a* of cable 80 extends spirally (counterclockwise in FIG. 4) within the transition piece 44 and the segments 72 for approximately 180° to the radial opening 3T in tip 34. Cable 80 then passes radially outwardly through opening 3T and extends clockwise about the outer periphery of tip 34 for a quarter turn and then extends radially inwardly through opening 2T. Upon return of the cable 80 through opening 2T, cable leg 80*b* of cable 80 extends internally and spirally (counterclockwise) about the openings through segments 72 for another approximately 180° to fixation point 4 on the sleeve 42. As illustrated in FIGS. 7 and 9, it will be appreciated that spirally wound legs 80*a* and 80*b* of cable 80 cross one another at 86.

The second cable is similarly threaded within the cooling tube 30 but commences and terminates at different fixation points. Thus, cable 82 has one end secured at fixed point 2 on sleeve 42 and leg 82*a* of cable 82 extends from point 2 spirally (clockwise) within transition piece 44, ball-socket segments 72 and tip 34 for approximately 180°. Cable 82 then extends radially outwardly through opening 4T, externally about (counterclockwise) tip 34 for about a quarter turn and re-enters tip 34 through radial opening 1T. Leg 82*b* of cable 82 then extends spirally (clockwise) for approximately 180° to fixation point 3 on sleeve 42.

As illustrated in FIG. 9, the internal legs 82*a* and 82*b* of cable 82 cross one another at 88. As best illustrated in FIG. 9, the legs 80*b* and 82*b* of cables 80 and 82 cross one another at 90 and the legs 82*a* and 80*a* cross one another at 92. With this thread-up arrangement of the cables internally within the transition piece 44, the ball-socket segments 72, and tip 34 with each cable fixed at opposite ends, these elements are maintained engaged with one another, i.e., the cables provide the sole means for maintaining the segments 72 engaged with one another. Thus, the flexible end portion 70 of the housing 14 may be articulated to follow the directionally controlled movement of the flexible end portion 16 of the borescope 12.

Figure 8:
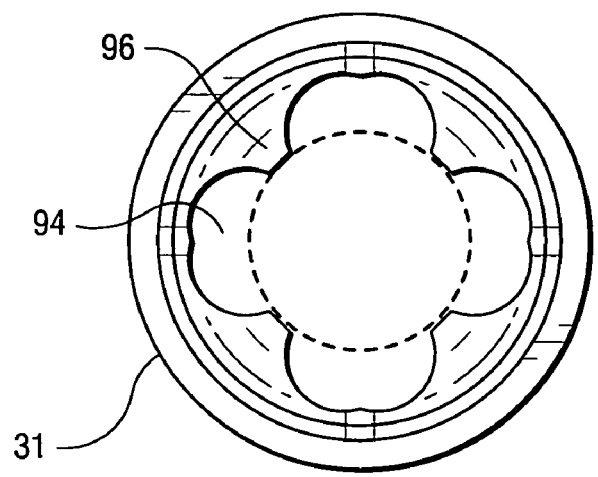
FIG. 8 is an end elevational view of the tip of the housing.

As illustrated in FIG. 8, tip 34 has an internal surface configuration including a plurality of channels 94 defined by radially inwardly projecting flanges 96. The flanges confine the video head 18 of the borescope. The channels 94 enable the cooling air flowing internally within the ball-socket segments 72 to flow into tip 34 and about the video head cooling the latter. The cooling air exits tip 34 through its open end and flows into the turbine during use.

It will be appreciated that as the video head 18 is directionally controlled via the joy stick 22, the articulated flexible movement of the flexible end portion 16 of the borescope carrying with it the flexible end portion of the housing. That is, the ball-socket segments 72 and tip 34 will follow the movement of the flexible end portion 16 of the borescope with the cables 80 and 82 maintaining the ball-socket segments 72, tip 34 and transition piece 44 engaged with one another. Simultaneously, the flow of the cooling medium, i.e. chilled cooling air continues to flow in the annular passage 51 along the liner 13 and the flexible end portion of the housing to cool the borescope throughout the range of directionally controlled articulation of the video head.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for insertion through an opening in an outer casing of a turbine and inspection of internal turbine components at elevated temperatures comprising:
    (a) an elongated borescope having a video head adjacent one end thereof;
    (b) an elongated housing for receiving said borescope; and
    (c) a cooling tube carried by said apparatus for flowing a cooling medium from a location external to the turbine to cool said borescope at a location at least adjacent said one end of the borescope thereby enabling inspection of internal turbine components at elevated temperatures, wherein said borescope includes a directionally controllable flexible end portion for moving the video head to different angular orientations within the turbine, said housing including a flexible end portion about the controllable flexible end portion of said borescope enabling the flexible end portion of the housing to follow the movement of the flexible end portion of the borescope, and further wherein said flexible end portion of said housing includes a plurality of adjacent hollow, substantially cup-shaped, and substantially identical one-piece segments encompassing at least part of the flexible end portion of the borescope, each individual one-piece segment comprised of an external convex ball surface and an internal concave socket surface, said plurality of segments arranged such that the convex ball surface of one segment is engaged with the concave socket surface of an adjacent segment; and
    (d) a pair of cables each secured to a fixed portion of said housing and extending along said segments to maintain the segments engaged with one another while enabling the flexible end portion of said housing to follow the angular movement of the flexible end portion of the borescope, wherein opposite ends of each said cable are secured to said fixed portion of said housing, each of said cables having legs which respectively extend (i) from said fixed housing portion arcuately about said flexible end portion of said housing to adjacent a tip of said housing and (ii) from said tip arcuately about said flexible end portion of said housing to said fixed housing portion to maintain said segments in contact one with the other, wherein each cable leg of each cable crosses another leg thereof at a location along said flexible end portion of said housing, and further wherein a leg of a first cable of said cables crosses another leg of said first cable, a leg of a second cable of said cables crossing another leg of said second cable, the legs of said first cable crossing legs of said second cable at two discrete locations along said flexible end portion of said housing.

2. Apparatus according to claim 1 including a chiller carried by said housing at a location remote from said one end thereof for cooling the cooling medium supplied to said cooling tube.

3. Apparatus according to claim 1 wherein said cooling tube and said borescope define a cooling air supply passage therebetween.

* * * * *